(No Model.)
C. W. LUTES.
TEA CHEST.
No. 539,227. Patented May 14, 1895.
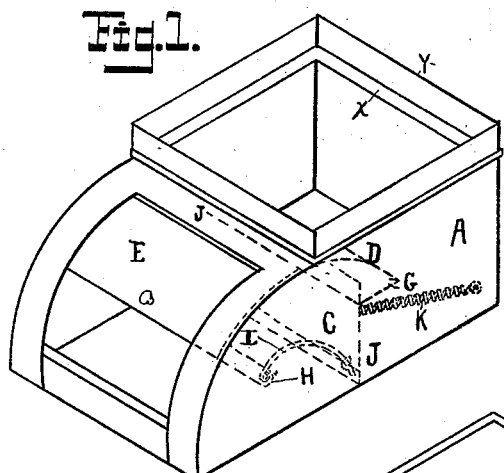
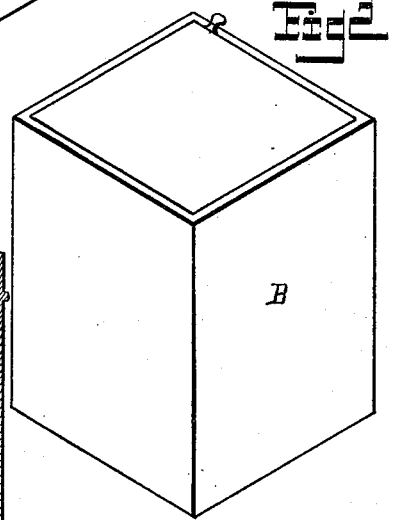
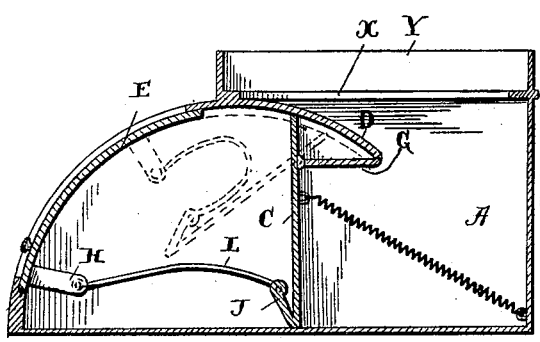
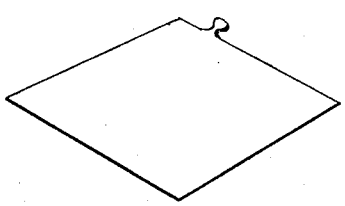
WITNESSES:
Charles Schafer.
Emma Stech.
INVENTOR
Charles W. Lutes.
BY Reichelt + Ottsch.
ATTORNEYS.

UNITED STATES PATENT OFFICE.

CHARLES WESLEY LUTES, OF WINNIPEG, CANADA, ASSIGNOR TO ROBERT MUIR, OF SAME PLACE.

TEA-CHEST.

SPECIFICATION forming part of Letters Patent No. 539,227, dated May 14, 1895.

Application filed December 8, 1894. Serial No. 531,244. (No model.) Patented in Canada June 4, 1894, No. 46,244.

*To all whom it may concern:*

Be it known that I, CHARLES WESLEY LUTES, a citizen of Canada, and a resident of Winnipeg, in the Province of Manitoba, Canada, have invented certain new and useful Improvements in Tea-Chests, (for which I have obtained a patent in Canada, No. 46,244, dated June 4, 1894,) of which the following is a specification.

My invention relates to an improved base for tea chests, and it consists in a base which is open at its top to receive the inverted end of the tea chest, and which is provided with a pivoted door or cover at its front, and a vertical spring actuated partition near its center which is operated by the pivoted door, and which serves to prevent the loose tea from moving forward in the base beyond a certain point, and thus becoming exposed to the action of the air.

The objects of my invention are to provide a base upon which the open tea chest is inverted, and in which the loose tea is held preserved from the effects of air and moisture; to expose only a small portion of the tea to the effects of the atmosphere during the time that the tea is being removed from the base; and to render the tea chest water proof by means of a cover which is applied to the chest by means of soft solder, and which can be readily removed by pulling upon the projecting part which is formed integral with one edge of the cover.

In the accompanying drawings, Figure 1 represents the base upon which the tea-chest is placed. Fig. 2 is a perspective of the tea-chest after the cover has been removed. Fig. 3 is a perspective of the cover of the chest provided with a projection upon one edge. Fig. 4 is a transverse vertical section, taken through the center of Fig. 1.

A represents the base which is made rectangular at its rear portion where the chest B is placed upon it, and which has the upper edges of its front portion made rounding, as shown. Through the top of the rear of the base is made an opening sufficiently large to allow the tea from the open end of the chest B to fall freely into the base, and around this opening is formed the horizontal supporting flange X upon which the lower edge of the tea chest is supported. Rising above the flange X is a vertical flange Y, which extends all around the opening, and which catches against the sides of the open end of the tea chest, so as to form a tight joint therewith and thus exclude the atmosphere from the tea. Extending downwardly at any desired angle into the rear portion of the base and from the front edge of the opening, is an inclined support D of any desired width, and which serves to prevent the tea from all dropping out of the chest B into the base. This support D is intended to have a large portion of the weight of the tea to rest directly upon it, and thus prevent the rear portion of the base from being filled with a larger quantity of tea than is desirable. Were it not for this support the greater portion of the contents of the chest would drop into the base and thus interfere with the action of the operating parts. Secured to the lower edge of the support D is the horizontal support G to the front edge of which the vertical partition C is hinged or pivoted in any suitable manner. Into the space between the two supports D, G, the upper edge of the vertical partition C moves when the cover is raised for the purpose of removing tea from the base. The pivots or hinges of the partition C are placed at a suitable distance from its upper edge and secured to the rear side of the partition below its support is the spring K which has its rear end fastened to the base at any suitable point. This spring serves to not only close the partition C when it is left free to move, but to sweep back into the rear portion of the base all of the tea which has fallen forward when the partition is raised.

The opening through the curved front of the base is closed by the pivoted door E, which is provided with the arms H at its lower front edge, and which arms are turned at an angle to the door and pivoted inside of the base, as shown. When the door E is raised its rear edge strikes against that part of the partition C which extends above the support G and by forcing back its upper edge raises the lower part of the partition, so as to let the tea fall forward where it can be readily removed as desired. Secured to the lower front edge of the partition C at one end is a weight J which projects upward at an angle, and which serves to assist in forcing the lower edge of the partition C back into place as soon as the door is closed, and at the same time causing it to force back the tea which has fallen forward under the lower edge of the partition. This partition C fits snugly between the sides of the base and its bottom, and the support upon which the partition moves, and thereby protects the tea in the base from the effects of the atmosphere. When the door E is opened the partition is operated, and then the spring K and the weight J unite in closing it against the pressure of the loose tea in the base as soon as the door is closed. In order to hold the partition positively in a raised position while the door is open the spring L is fastened to the upper end of the weight J and to the arm H of the cover E, so that as the cover is forced backward the spring L forces back upon the weight J at the same time, and thus holds the partition positively open. When the door is closed the spring L exerts a downward pull upon the weight J, and thus assists in closing the partition and forcing the tea into the rear portion of the base.

In order to make the tea chests B water proof its cover O is made of tin, and is applied to the chest by means of soft solder. Projecting from one edge of this cover O is a projection P which extends beyond the side of the chest, and while the chest is in transportation, is pressed down against the side of the chest so as to be out of the way. When the chest is to be opened this projection P is raised, and by exerting a strong pull upon it, the cover is removed. The base A is then inverted and placed upon the top of the chest, and then with the chest fitting in between the flanges Y and resting upon the flanges X the chest and base are turned into their proper position, a portion of the loose tea from the chest then falls into the lower portion of the base while a larger proportion is prevented from dropping into the base A by the support D.

By making the chest B of tin and applying the cover O as above described the chest is made both air and water proof, and after the chest has been opened the tea is protected from atmospheric effects by the flanges X, Y, upon the top of the base A, which is also made of sheet metal. After the tea has fallen into the base A it is protected from the air in front by the partition C and door E all the time except when the door is opened to take some of the tea out. The space between the door E, and the partition C forms a dead air chamber which assists in protecting the tea from any atmospheric changes.

Having thus described my invention, I claim—

1. A base adapted to have a tea chest open at one end applied to the top of its rear portion, combined with a support placed inside of the base, a spring actuated partition, and a door which when opened strikes against the partition and opens it, substantially as shown.

2. The base A open at the top of its rear portion, combined with the supports D, G, the partition loosely connected to the support G, the spring K applied to the rear of the partition, and the door which when opened has its rear edge to strike against the upper edge of the partition and raise it at its lower edge so as to allow access to the tea, substantially as described.

3. The base having an opening through its top to receive the open end of a tea chest, combined with the spring actuated partition, a weight or arm applied to the outer side of the partition, and the door, which when opened strikes against the upper edge of the partition so as to raise it at its lower one, and allow access to the tea, substantially as set forth.

4. A base, open at its top and adapted to receive the open end of a tea chest, combined with a spring actuated partition, a weight or arm which is applied to the outer side of the partition, a door, which when opened operates the partition, and a spring applied to the door and weight, for the purpose of holding the partition in an open position, substantially as specified.

5. The base open at the top of its rear portion, and provided with the flanges X, Y, combined with a tea chest B which is applied thereto, the two supports D, G, the spring actuated partition applied to the support G, the weight or arm J secured to the lower edge of the partition, the spring L, and the door E, which has its rear edge to strike against the partition, at its top edge, and raise it at its lower one, so as to give access to the tea, substantially as described.

In testimony that I claim the foregoing as my invention I have signed my name in presence of two subscribing witnesses.

CHARLES WESLEY LUTES.

Witnesses:
ED. R. COLEMAN,
CHAS. WEST.